United States Patent
Park

(10) Patent No.: US 9,918,311 B2
(45) Date of Patent: *Mar. 13, 2018

(54) METHODS AND ARRANGEMENTS TO DETERMINE STATION ASSIGNMENTS TO RESTRICTED ACCESS WINDOWS IN WIRELESS NETWORKS

(71) Applicant: Intel IP Corporation, Santa Clara, CA (US)

(72) Inventor: Minyoung Park, Portland, OR (US)

(73) Assignee: INTEL IP CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/410,189

(22) PCT Filed: Dec. 25, 2013

(86) PCT No.: PCT/US2013/077731
§ 371 (c)(1),
(2) Date: Dec. 22, 2014

(87) PCT Pub. No.: WO2014/130155
PCT Pub. Date: Aug. 28, 2014

(65) Prior Publication Data
US 2016/0021656 A1    Jan. 21, 2016

Related U.S. Application Data

(60) Provisional application No. 61/769,022, filed on Feb. 25, 2013.

(51) Int. Cl.
*H04W 72/04*    (2009.01)
*H04B 7/24*    (2006.01)
*H04L 29/08*    (2006.01)

(52) U.S. Cl.
CPC .......... *H04W 72/0446* (2013.01); *H04B 7/24* (2013.01); *H04L 67/145* (2013.01)

(58) Field of Classification Search
None
See application file for complete search history.

(56) References Cited

U.S. PATENT DOCUMENTS 8,310,998 B2    11/2012  Arnott et al.
2007/0171933 A1    7/2007  Sammour et al.
(Continued)

FOREIGN PATENT DOCUMENTS

CN    101405983    4/2009
JP    2006067089    3/2006
(Continued)

OTHER PUBLICATIONS

IEEE, "Wireless LAN Medium Access Control (MAC) and Physical layer (PHY) Specifications", IEEE Standard for Information technology—Telecommunications and information exchange between system Local and metropolitin area networks—Specific requirments, IEEE std 802.11, Mar. 29, 2012, pp. 1-2793.

(Continued)

*Primary Examiner* — Huy D Vu
*Assistant Examiner* — James P Duffy
(74) *Attorney, Agent, or Firm* — Shichrur & Co.

(57) ABSTRACT

Logic may implement a restricted access window association scheme that uses information provided in traffic indication map (TIM) bitmap and restricted access window (RAW) parameter set (PS) to determine stations associated with RAWs. The TIM information element (IE) may comprise a bitmap indicating paged and unpaged stations. The RAW PS IE may comprise a range of station association identifiers (AIDs) and possibly other station selection data. Logic may determine a range of stations associated with a (Continued)

| RAW PARAMETER SET IE | | 1800 | | | | | | | |
|---|---|---|---|---|---|---|---|---|---|
| ELEMENT ID 1802 | LEN 1806 | PAGE ID 1808 | RAW START AID 1810 | RAW END AID 1812 | RAW START TIME 1814 | RAW DURATION 1815 | PAGED STA ONLY 1816 | GROUP/ RESOURCE ALLOAT FIELD 1818 | SLOT DEF 1820 |

RAW based upon AIDs for the first and last stations in the range based upon a position for the station in the TIM bitmap. And the range of stations associated with a RAW may be independent of block associations of the first and last stations in the TIM bitmap.

30 Claims, 6 Drawing Sheets

(56) References Cited

U.S. PATENT DOCUMENTS

| | | | |
|---|---|---|---|
| 2011/0026446 A1 | 2/2011 | Stacey | |
| 2013/0229959 A1* | 9/2013 | Ghosh | H04W 74/08 370/311 |
| 2015/0124722 A1 | 5/2015 | Seok | |

FOREIGN PATENT DOCUMENTS

| | | |
|---|---|---|
| JP | 2009530874 | 8/2009 |
| JP | 2015519788 | 7/2015 |
| RU | 2008141293 A | 4/2010 |
| RU | 2011119596 | 11/2012 |
| WO | 2012141758 | 10/2012 |
| WO | 2013/162340 | 10/2013 |
| WO | 2014/130155 A1 | 8/2014 |

OTHER PUBLICATIONS

Office Action for Taiwanese Patent Application No. 103106076, mailed on Jul. 9, 2015, 4 pages.
International Preliminary Report on Patentability for PCT/US2013/077731, mailed on Sep. 3, 2015, 8 pages.
International Search Report and Written Opinion received for PCT Patent Application No. PCT/US2013/077731, mailed on Apr. 10, 2014, 12 pages.
Ghosh et al., "Restricted Access Window Signaling for Uplink Channel Access", IEEE 802.11-12/0843r0, Jul. 16, 2012, 13 pages.
Park et al., "RAW Slot Assignment", IEEE 802.11-12/1321r0, Nov. 12, 2012, 13 pages.
Merlin et al., "Channel indication in RAW/TWT", IEEE 802.11-13/0071r0, Jan. 14, 2013, 14 pages.
Park, Minyoung, "Proposed Specification Framework for Tgah", IEEE 802.11-11/1137r13, Jan. 14, 2013, 58 pages.
Office Action for Japanese Patent Application Serial No. 2015-503694, mailed on Oct. 27, 2015, 8 pages (including 4 pages of English translation).
Office Action for Japanese Patent Application Serial No. 2015-503694, mailed on Jun. 21, 2016 6 pages (Including 3 pages of English translation).
Notice of Allowance for Russian Patent Application No. 2015130648/07, dated Aug. 9 2016, 12 pages.
European Search Report for European Patent Application No. 13875797.6 dated Sep. 20, 2016, 7 pages.
Yongho Seok (LG Electronics): "Uplink Channel Access General Procedure; 11-12-0831-00-00ah-uplink-channel-access-general-procedure", IEEE SA Mentor: 11-12-0831-00-00AH-Uplink-Channel-Access-General-Procedure, IEEE-SA Mentor, Piscataway, NJ USA, vol. 802.11ah, Jul. 16, 2012, 19 pages.
Intel Corp: "TGah SFD D9.x; 11-12-0953-01-00ah-tgah-sfd-d9-x", IEEE SA Mentor; 11-12-0953-01-00AH-TGAH-SFD-D9-X, IEEE-SA Mentor, Piscataway, NJ USA, vol. 802.11ah, No. 1, Jul. 19, 2012, 30 pages.
Office Action for Chinese Patent Application No. 201380017092.8, dated Nov. 1, 2016, 11 pages.
English translation dated Feb. 24, 2017 of Nov. 1, 2016 Office Action for Chinese Patent Application No. 201380017092.8, 10 pages.
Office Action for U.S. Appl. No. 15/419,207, dated May 19, 2017, 36 pages.
Office Action for Chinese Patent Application No. 201380017092.8, dated Jun. 28, 2017, 18 pages. (Including 9 pages of English translation).
Office Action for Japanese Patent Application No. 2015-503694, dated Oct. 31, 2017, 4 pages (Including 2 pages of English translation).
Office Action for Russian Patent Application No. 2016139991, dated Dec. 7, 2017, 8 pages (Including 2 pages of English translation).

* cited by examiner

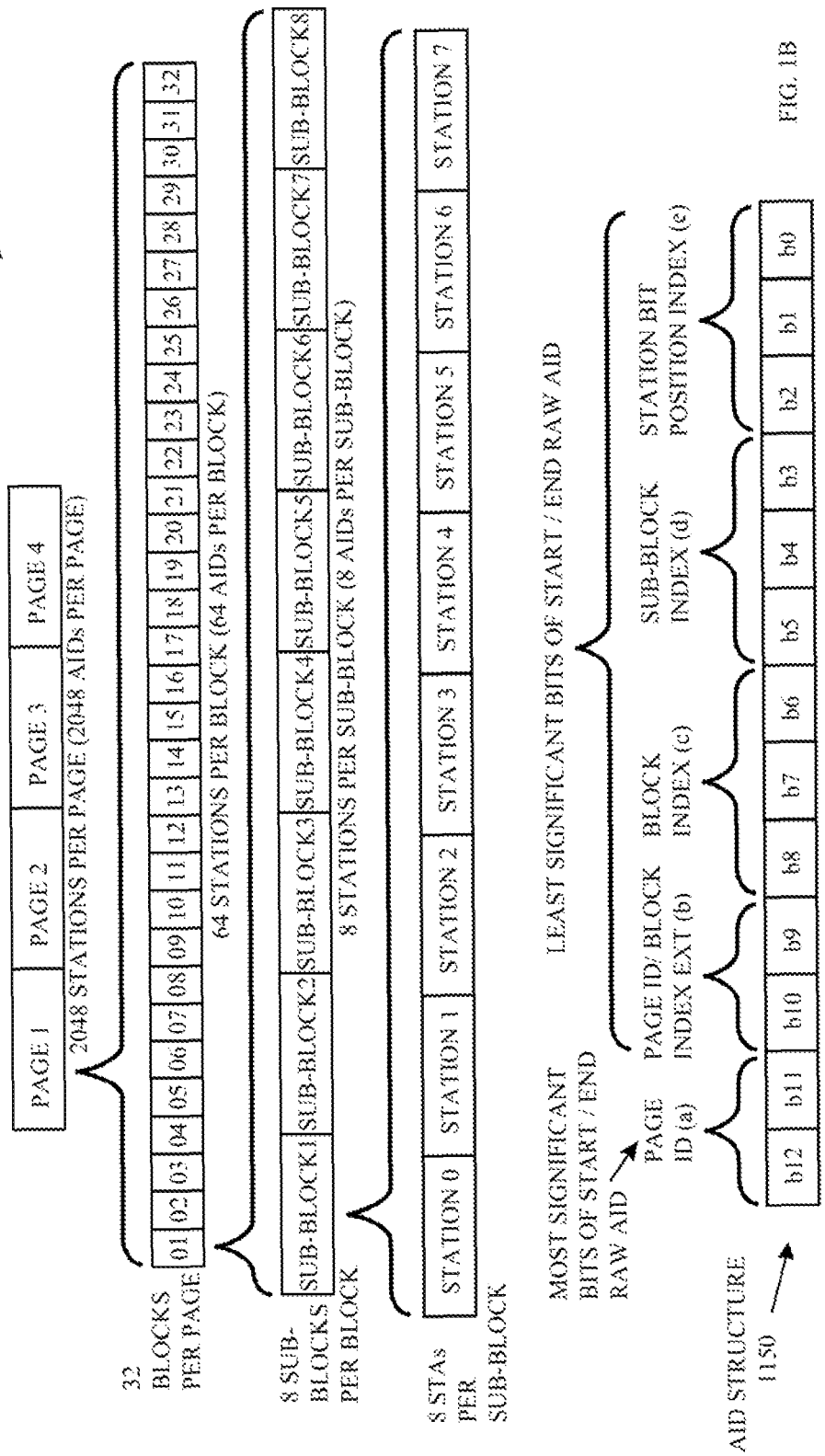

FIG. 1C

MANAGEMENT FRAME 1500

| 2 | | 0-2312 | 4 |
|---|---|---|---|
| FRAME CONTROL 1502 | OTHER MAC HEADER FIELDS 1508 | FRAME BODY 1514 [TIM IE 1520] | FCS 1526 |

OCTETS: 2

MAC HEADER 1501

FIG. 1E

MANAGEMENT FRAME 1700

| 2 | | VARIABLE | 4 |
|---|---|---|---|
| FRAME CONTROL 1702 | OTHER MAC HEADER FIELDS 1708 | FRAME BODY 1714 [RAW PS IE 1720] | CRC 1726 |

OCTETS: 2

MAC HEADER 1701

FIG. 1D

TIM INFORMATION ELEMENT (IE) 1600

| ELEMENT ID 1602 | LEN 1606 | DTIM COUNT 1608 | DTIM PERIOD 1610 | TIM PARAMETER 1611 | TIM BITMAP CONTROL FIELD 1612 | TIM BITMAP 1614 |

FIG. 1F

RAW PARAMETER SET IE 1800

| ELEMENT ID 1802 | LEN 1806 | PAGE ID 1808 | RAW START AID 1810 | RAW END AID 1812 | RAW START TIME 1814 | RAW DURATION 1815 | PAGED STA ONLY 1816 | GROUP/ RESOURCE ALLOCAT FIELD 1818 | SLOT DEF 1820 |

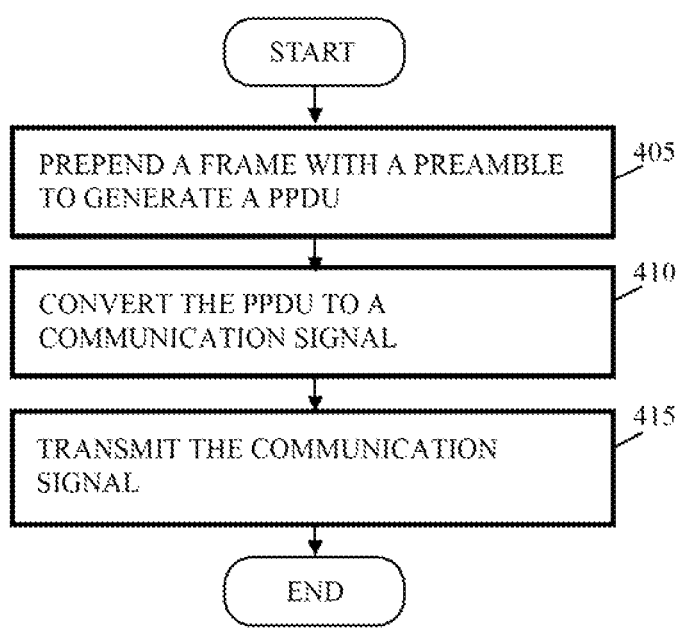

METHODS AND ARRANGEMENTS TO DETERMINE STATION ASSIGNMENTS TO RESTRICTED ACCESS WINDOWS IN WIRELESS NETWORKS

BACKGROUND

Embodiments are in the field of wireless communications. More particularly, embodiments are in the field of communications protocols between wireless transmitters and receivers.

BRIEF DESCRIPTION OF THE DRAWINGS

FIGS. 1A-B depict embodiments of a hierarchical data structure for traffic indication mapping an association identifier (AID) for the hierarchical data structure illustrated in FIG. 1A;

FIGS. 1C-F depict embodiments of management frames and frame elements for determining a assignments of stations to a restricted access window (RAW):

FIGS. 4A-B depict embodiments of flowcharts to transmit, receive, decode, and interpret communications with frames as illustrated in FIGS. 1-2.

DETAILED DESCRIPTION OF EMBODIMENTS

Figure 1:
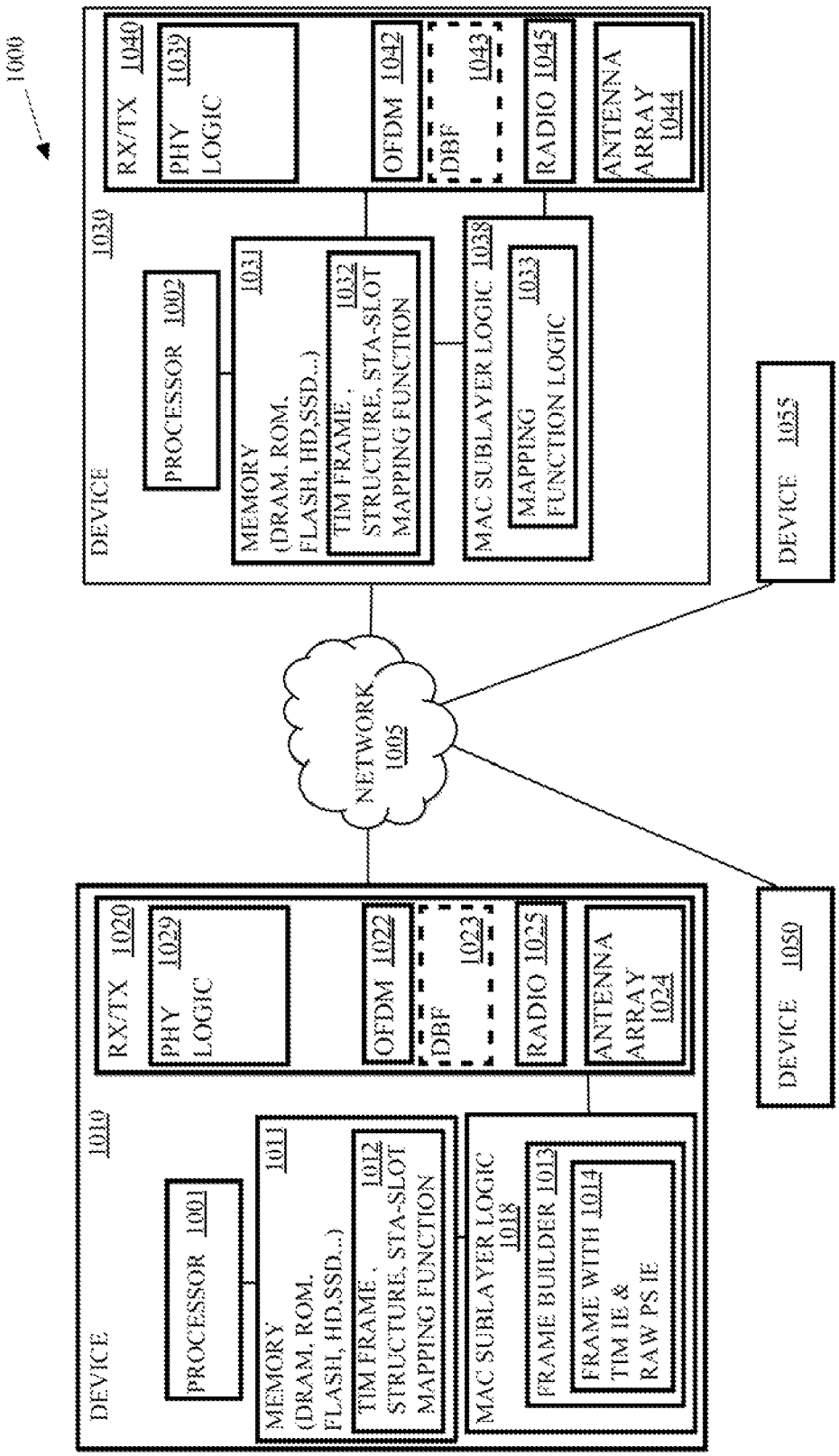
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments may implement a restricted access window (RAW) association scheme that provides and uses information such as a range of stations that can communicate in a RAW. Many embodiments define a RAW start association identifier (AID) and a RAW end AID to define a range of stations associated with the RAW. Some embodiments define the range of stations in a RAW parameter set (PS) information element (IE). A RAW is a time frame during which only a group of stations can access a wireless medium. In many embodiments, the RAW may be implemented for the purpose of, e.g., reducing contention among the stations. Reducing the contention amongst the stations can reduce the amount of time that the stations must be awake, awaiting or contending for access to the wireless medium to communication with, e.g. an access point. For example, a station may be a very low power or ultra low power device that operates on battery power so the station may preferably remain in a low power state or sleep state until the station needs to communicate data to or receive buffered data from the access point.

The RAW consists of time slots and each station associated with the RAW may be assigned a time slot during which the station is allowed to start accessing the wireless medium. In many embodiments, the RAW Parameter Set information element (RAW PS LE) may define a group of stations (a RAW group) that are allowed to access the wireless medium during a RAW as well as a structure of the RAW.

The RAW PS IE may be included in, e.g., a management frame such as a beacon frame and may comprise a page identifier (ID), a RAW start AID, a RAW end AID, a RAW start time, and a RAW duration. In some embodiments, Medium Access Control (MAC) sublayer logic, or MAC logic, of an access point may select the RAW start AID and the RAW end AID independent of the block associations of the RAW start AID and the RAW end AID in a traffic indication mapping (TIM) bitmap. And a receiving station may determine whether or not the receiving station is associated with the RAW based upon the AID for the receiving station indicated in the TIM bitmap.

The TIM bitmap identifies each station via a bit on a page at the station's AID in the bitmap based upon an assignment of the station to a position in the TIM bitmap. Furthermore, a management frame may include a TIM IE to indicate to a receiving station whether or not the station may have data buffered at the access point. In several embodiments, a TIM IE may comprise a bitmap to indicate paged and unpaged stations. Paged stations are stations identified to have data buffered at an access point. Unpaged stations, which are also referred to as non-paged stations, are stations that are not identified to have data buffered at an access point.

Many embodiments comprise MAC logic to generate and transmit management frames with RAW PS IEs to associate stations with the RAW for the purposes of uploading or down loading data. Further embodiments comprise MAC logic to generate and transmit frames such as PS Polls for downlink bufferable unit (BU) delivery during a RAW.

Various embodiments may be designed to address different technical problems associated with assigning stations to a restricted access window. For instance, some embodiments may be designed to address one or more technical problems such as associating a particular number of stations with a RAW. In other words, current RAW definitions facilitate the association of stations with a RAW in a management frame with a granularity of a block. A block may be associated with 64 stations or 64 AIDs in, e.g., IEEE 802.11ah systems. Thus, some embodiments may address the problem of having a minimum granularity for communication of RAW associations.

Different technical problems such as those discussed above may be addressed by one or more different embodiments. For instance, some embodiments that are designed to address assigning stations to a restricted access window may do so by one or more different technical means such as communicating RAW associations by a range of stations. Many embodiments may determine the range of stations independent of block associations with stations within the range. Several embodiments identify the range of stations based upon, e.g., a page ID, a RAW start AID, and a RAW end AID. The page ID can identify which page of stations is associated with a RAW. The RAW start AID may define the first station within the range of stations such that if a station has an AID that is equal to or greater than the RAW start AID, the station might be within the range of stations associated with the RAW. And, the RAW end AID may define the last station within the range of stations such that if a station has an AID that is equal to or greater than the RAW start AID and less than or equal to the RAW end AID, the station is within the range of stations associated with the RAW. If a receiving station determines that it is within the RAW AID range, the receiving station may parse the RAW information further to determine the RAW is associated with the receiving station. For instance, the RAW PS IE may indicate that only certain stations within the range are associated with the RAW such as stations with data buffered at an access point.

Some embodiments implement Institute of Electrical and Electronic Engineers (IEEE) 802.11 systems such as IEEE 802.11ah systems and other systems that operate in accordance with standards such as the IEEE 802.11-2012, IEEE Standard for Information technology—Telecommunications and information exchange between systems-Local and metropolitan area networks—Specific requirements—Part 11: Wireless LAN Medium Access Control (MAC) and Physical Layer (PHY) Specifications (http://standards.ieee.org/getieee802/download/802.11-2012.pdf).

According to one embodiment, the TIM bitmap based upon the hierarchical data structure for traffic indication mapping is defined to enable a greater number of associated stations and to utilize a more efficient TIM element and, in many instances, smaller TIM element for low-power consumption stations such as small battery-powered wireless devices (e.g., sensors) to use Wi-Fi to connect to the Internet with very low power consumption.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

Initially, the communications device 1030 may associate with the communications device 1010 and receive an association identifier (AID) from the communications device 1010 to uniquely identify the communications device 1030 with respect to other communications devices 1050 and 1055 associated with the communications device 1010. In many embodiments, the AID may comprise 13 bits, wherein the bits identify the page, block, sub-block, and a bit position for the station within the sub-block. FIG. 1B depicts an embodiment of such an AID structure 1150. Thereafter, the communications device 1010 may buffer data such as medium access control (MAC) service data units (MSDUs) for the communications device 1030.

After buffering an MSDU for the communications device 1030, the communications device 1010 may transmit a beacon to associated devices, identifying the devices with data buttered by the communications device 1010 by means of a traffic indication map (TIM) information element (IE) such as the frame 1014. In the present embodiment, the TIM information element may identify the AID of each station that has data buffered such as the communications device 1030 by identifying the page, the block, and, depending upon the encoding of the block, the sub-block of the stations. The TIM information element may also comprise a number of bits such as eight bits that identify the stations in the sub-block that have buffered data via logical ones and zeroes. In many embodiments, a logical one at the bit location in the sub-block associated with the communications device 1030 may indicate that the communications device 1010 is buffering data for the communications device 1030. In further embodiments, a logical zero may represent that the communications device 1010 is buffering data for the communications device 1030.

In several embodiments, the communications device 1010 may transmit and the communications device 1030 may receive a restricted access window parameter set information element (RAW PS IE) either in the same beacon as the TIM bitmap or in another MAC frame of the same or different transmission. In many embodiments, the MAC sublayer logic 1018 may generate a frame with the RAW PS IE such as a beacon frame 1014 to define a range of stations associated with the RAW. In several embodiments, the range of stations associated with the RAW are identified by a first association identifier (AID) to identify a first station in the range of RAW assignments and by a last station in the range of RAW assignments. Advantageously, selection of the first station in the range of RAW assignments and the last station in the range of RAW assignments is independent of locations of the first station and last station within blocks of the AIDs of stations associated with the communications device 1010. In many embodiments, selection of the first station in the range of RAW assignments and the last station in the range of RAW assignments is independent of locations of the first station and last station within blocks of the page associated with a page identifier that is transmitted along with the range stations associated with the RAW.

The RAW PS IE may identify stations that can access the medium during the RAW, a RAW start time, and a RAW duration (Traw) for the restricted access window. In many embodiments, the RAW PS IE may comprise a page ID to identify the page of AIDs to which the RAW PS IE is associated. In some embodiments, the RAW PS IE may comprise a RAW start AID and a RAW end AID. The RAW start AID may identify the AID of the first station in a range of stations potentially associated with the RAW. The RAW end AID may identify the AID of the last station in a range of stations potentially associated with the RAW. And one or more other bits of the RAW PS IE may indicate whether or not particular stations have access to the medium during the RAW.

In several embodiments, the communications device 1010 may restrict the usage of the RAW to paged stations by including, e.g., a flag in the RAW Parameter Set IE. Paged stations refer to stations that have data buffered by the communications device 1010 and stations with data buffered are identified in the TIM bitmap of the TIM information element. If the restricted access window is limited to paged stations, the communications device 1030 may interpret the TIM information element based upon the AID assigned to the communications device 1030 by the communications device 1010. In many embodiments, the communications device 1030 may parse the AID to determine a page associated with communications device 1030 and may parse the TIM information element to determine if the TIM information element describes data buffering for stations associated with the same page. If so, the communications device 1030 may parse the TIM information element to determine if the TIM information element describes data buffering for stations if the block index from the AID falls within the range of block indexes identified by a start block index and/or an end block index. If so, the communications device 1030 may repeat the process of parsing the association identifier and comparing the values of the block and sub-block with those represented by the TIM information element. The communications device 1030 may compare the values to determine whether the TIM information element indicates that the communications device 1010 is buffering data for the communications device 1030 and/or whether the TIM information element includes data at the bit position in the sub-block associated with the communications device 1030 that indicates that the communications device 1010 is buffering data for the communications device 1030.

In other embodiments, the TIM information element may include a TIM bitmap that is a TIM segment. The TIM segment may represent part of one page of the traffic indication map and may be associated with a TIM segment number as well as a starting block and a block range. In some of these embodiments, the communications device 1030 may determine whether the TIM bitmap includes the block of the traffic indication map covering the communications device 1030 by the TIM segment number. Thereafter, the communications device 1030 may parse the blocks and sub-blocks to determine whether or not the communications device 1010 is buffering data for the communications device 1030 and, in some embodiments, the number of paged stations prior to the communications device 1030 within the TIM bitmap.

If the restricted access window is not limited to paged stations, then the restricted access window may be open to paged and unpaged stations associated with the TIM bitmap in the TIM information element. In such embodiments, the communications device 1030 may verify that the TIM bitmap covers the association identifier (AID) for the communications device 1030 and, if so, the communications device 1030 may determine that the position of the AID for the communications device 1030 is the AID or a portion of the AID such as the last several bits.

In addition to determining the position of the communications device's 1030 AID within the TIM bitmap, the MAC sublayer logic 1038 may parse and interpret RAW PS IE to determine the RAW start AID, the RAW end AID, the RAW start time, and the RAW duration (Traw). In many embodiments, the MAC sublayer logic 1038 may parse and interpret RAW PS IE to determine if the communications device 1030 is associated with the RAW. In some embodiments, the MAC sublayer logic 1038 may parse and interpret RAW PS IE to determine the slot of the RAW associated with the communications device 1030.

In many embodiments, the communication device 1030 may attempt to minimize processing of the RAW PS IE to an extent possible so the communication device 1030 may first parse the page ID to determine if the RAW start and end AIDs are on the same page as the communications device 1030. In several embodiments, the most significant bits (MSBs) in the AID of a station indicate the page on which the station resides. If the RAW PS IE refers to the same page on which the communications device 1030 resides, the communications device 1030 may determine the RAW start AID. In some embodiments, the RAW start AID may represent the least significant bits (LSBs) of the AID of stations in the range of stations that may access the medium during the RAW. In such embodiments, the communications device 1030 may compare the RAW start AID to the AID of the communications device 1030 to determine if the RAW start AID is less than or equal to the LSBs of the AID of the communications device 1030. Furthermore, if the RAW start AID is less than or equal to the LSBs of the AID of the communications device 1030, the communications device 1030 may compare the RAW end AID to the AID of the communications device 1030 to determine if the RAW end AID is greater than or equal to the LSBs of the AID of the communications device 1030.

In other embodiments, the communications device 1030 may compare the AID of the communications device 1030 to the RAW start AID and, if greater than or equal to the RAW start AID, the communications device 1030 may compare the AID of the communications device 1030 to the RAW end AID to determine if the RAW end AID is less than or equal to the RAW end aid. If the communications device 1030 determines that the AID of the communications device 1030 is within the range of AIDs associated with the RAW, the communications device 1030 may then determine the slot within the RAW that is associated with the communications device 1030. In some embodiments, a mapping function in memory 1031 of the communications device 1030 may determine a slot during which the communications device 1030 may contend for access to the communications device 1010.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 10005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise processors 1001 and 1002, memory 1011 and 1031, medium access control (MAC) sublayer logic 1018 and 1038, and physical layer (PHY) logic 1019 and 1039, respectively. The processors 1001 and 1002 may comprise any kind of data processing device such as a microprocessor, a microcontroller, a state machine, and/or the like. The memory 1011 and 1031 may comprise a storage medium such as dynamic random access memory (DRAM), read only memory (ROM), butters, registers, cache, flash memory, hard disk drives, solid-state drives, or the like. The memory 1011 and 1031 may store frames and/or frame structures, or portions thereof such as a management frame structure and a traffic indication map (TIM) information element based upon a hierarchical data structure such as the hierarchical data structure 1100 illustrated in FIG. 1A. Furthermore, the memory 1011 and 1031 may comprise at least a portion of a traffic indication map in a hierarchical data structure that identifies the associated stations for which data is buffered. For example, the memory 1011 may comprise an indication that the communications device 1010 comprises buffered data as well as a reference or link to the buffered data for the communications device 1030.

The MAC sublayer logic 1018, 1038 may comprise logic to implement functionality of the MAC sublayer of the data link layer of the communications device 1010, 1030. The MAC sublayer logic 1018, 1038 may generate the frames such as management frames and the physical layer logic 1029, 1039 may generate physical layer protocol data units (PPDUs) based upon the frames. For example, a frame builder 1013 of the MAC sublayer logic 1018 may generate frames with a TIM IE and RAW PS IE 1014 and a data unit builder of the physical layer logic 1029 may prepend the frames with preambles to generate PPDUs for transmission via a physical layer device such as the transceivers (RX/TX) 1020 and 1040.

The frame(s) with the TIM information element and the RAW PS IE 1014 may comprise the same management frame with both information elements or multiple frame(s) such as the management frames 1500 in FIG. 1C and 1700 in FIG. 1E. In particular, the frame with the TIM information element 1014 may comprise a TIM bitmap based upon a hierarchical data structure such as the TIM bitmap 1600 illustrated in FIG. 1D and may identify each station within, e.g., one page, that has data buffered by an AP such as the communications device 1010. For example, the AP may not arbitrarily transmit MSDUs to stations operating in a power saving (PS) mode, but may buffer the MSDUs and only transmit the MSDUs at designated times. Furthermore, the stations that currently have buffered MSDUs within the AP may be identified in a frame comprising a TIM information element, which may be included. e.g., as an element within beacon frames generated by the AP. Then, each station may determine that an MSDU is buffered for the station (such as communications device 1030) by receiving and interpreting the TIM information element in the beacon frame. The station may interpret the TIM element by parsing the TIM element. In a base service set (BSS) operating under a distributed coordination function (DCF), upon determining that an MSDU is currently buffered in the AP, a station operating in the PS mode may transmit a PS Poll frame to the AP, which may respond with the corresponding buffered MSDU immediately, or acknowledge the PS Poll and respond with the corresponding MSDU at a later time.

In some embodiments, the communications device 1010 may protect the PS Poll/Trigger frames by setting the network allocation vector (NAV). In many embodiments, the paged station can ignore the NAV set by the communications device 1010. In several embodiments, if NAV is set, then only paged stations (STAs) can send PS Poll/Trigger frames during the RAW.

The communications devices 1010, 1030, 1050, and 1055 may each comprise a transceiver such as transceivers (RX/TX) 1020 and 1040. In many embodiments, transceivers 1020 and 1040 implement orthogonal frequency-division multiplexing (OFDM) 1022, 1042. OFDM 1022, 1042 implements a method of encoding digital data on multiple carrier frequencies. OFDM 1022, 1042 comprises a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs. And guard intervals may be inserted between symbols such as between every OFDM symbol as well as between the short training field (STF) and long training field (LTF) symbols in the front end of the transmitter during transmission to avoid inter-symbol interference (ISI), which might result from multi-path distortion.

Each transceiver 1020, 1040 comprises a radio 1025, 1045 comprising an RF transmitter and an RF receiver. The RF transmitter comprises an OFDM 1022, which impresses digital data. OFDM symbols encoded with tones, onto RF frequencies, also referred to as sub-carriers, for transmission of the data by electromagnetic radiation. In the present embodiment, the OFDM 1022 may impress the digital data as OFDM symbols encoded with tones onto the sub-carriers to for transmission. The OFDM 1022 may transform information signals into signals to be applied via the radio 1025, 1045 to elements of an antenna array 1024. An RF receiver receives electromagnetic energy at an RF frequency and extracts the digital data from the OFDM symbols.

In some embodiments, the communications device 1010 optionally comprises a Digital Beam Former (DBF) 1023, as indicated by the dashed lines. In some embodiments, the DBF 1023 may be part of the OFDM 1022. The DBF 1023 provides spatial filtering and is a signal processing technique used with antenna array 1024 for directional signal transmission or reception. This is achieved by combining elements in a phased antenna array 1024 in such a way that signals at particular angles experience constructive interference while others experience destructive interference. Beamforming can be used at both the transmitting and receiving ends in order to achieve spatial selectivity. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises the transceiver (RX/TX) 1040 to receive and transmit signals from and to the communications device 1010. The transceiver (RX/TX) 1040 may comprise an antenna array 1044 and, optionally, a DBF 1042.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

FIG. 1A depicts an embodiment of a hierarchical data structure 1100 for traffic indication mapping with four pages and 32 blocks per page. On the top level of the hierarchy, the traffic indication virtual map may be divided into four pages. Each page may support up to 2048 stations and, in several embodiments, each page may be transmitted as a partial virtual bitmap in a separate TIM information element. In some embodiments, multiple TIM information elements may be transmitted in the same medium access control (MAC) service data unit (MSDU). In further embodiments, multiple MSDUs may be aggregated in each physical layer (PHY) protocol data units (PPDUs). In other embodiments, the hierarchical data structure 1100 may comprise more or less than four pages.

Each page illustrated comprises up to 32 blocks per page and each of the 32 blocks may support up to 64 of the stations. In other words, each block may represent 64 AIDs associated with stations. Each block may comprise eight sub-blocks. Each sub-block may be one octet in length and may support eight of the stations associated with the corresponding block. In further embodiments, each block may comprise more or less than eight sub-blocks and each of the sub-blocks may be more or less than one octet in length.

Each bit of a sub-block may correspond to a different association identifier (AID) and thus, each bit may uniquely identify a station. In the present embodiment, the bit may be set to 1 if there is data buffered at the AP. Otherwise, the bit may be cleared to 0.

FIG. 1B depicts an embodiment of an association identifier structure 1150 for the hierarchical data structure illustrated in FIG. 1A. In the present embodiment, the AID comprises 13 bits (b0 through b12). In other embodiments, the AID structure 1150) may comprise more or less than 13 bits.

In the present embodiment, the AID structure 1150 may comprise a page identifier (ID) having two bits (b12-b11), which is represented as "a" in the AID equation depicted below the AID structure 1150. The page ID may be the MSBs of the RAW start AID and the RAW end AID. The AID structure 1150 may comprise a page ID/block index extension having two bits (b10-b9), which is represented as "b" in the AID equation. The page ID/block index extension may facilitate a greater ratio of pages per block or blocks per page. The AID structure 1150) may comprise a block index having three bits (b8-b6), which is represented as "c" in the AID equation. The AID structure 1150 may comprise a sub-block index having three bits (b5-b3), which is represented as "d" in the AID equation. And, the AID structure 1150 may comprise a station bit position index having three bits (b2-b0), which is represented as "e" in the AID equation. Note also that the last 11 bits (b10 through b0) in the present embodiment represent the LSBs of the RAW start AID and the RAW end AID.

The AID equation may describe the calculation of a unique number per station based upon the hierarchical data structure illustrated in FIG. 1A. In particular, the AID unique number in this embodiment may be calculated by the following formula:

$$AID=((((\text{Page ID}\times 4+(\text{Page ID/Block index extension}-1))\times 8+(\text{Block index}-1))\times 8+(\text{Sub-block index}-1))\times 8+(\text{station bit position index})$$

To illustrate, if the variables are: the Page ID=0, the page ID/block index=1, the block index=2, the sub-block index=6. As a result, the equation becomes:

$$AID=((((0\times 4+(1-1))\times 8+(2-1))\times 8+(6-1))\times 8+(4)=108$$

FIGS. 1C-F depict embodiments for assigning stations to a restricted access window based upon a traffic indication map element bitmap. More specifically, FIGS. 1C-F depict embodiments of management frames and frame elements for associating a range of stations with a restricted access window. FIG. 1C depicts an embodiment of a management frame 1500 for communications between wireless communication devices such as communications devices 1010, 1030, 1050, and 1055 in FIG. 1. The management frame 1500 may comprise a MAC header 1501, a frame body 1514, and a frame check sequence (FCS) field 1526. The MAC header 1501 may comprise the frame control field 1502 and other MAC header fields 1508. The frame control field 1502 may be two octets and may identify the type and subtype of the frame such as a management type and, e.g., a beacon frame subtype. The other MAC header fields 1508 may comprise, for example, one or more address fields, identification fields, control fields, or the like.

In some embodiments, the management frame 1500 may comprise a frame body 1514. The frame body 1514 may be a variable number of octets and may include data elements, control elements, or parameters and capabilities. In the present embodiment, the frame body 1514 comprises a traffic indication map (TIM) element 1520. In other embodiments, the frame body 1514 may also comprise a RAW PS IE such as the RAW PS IE 1720 described in conjunction with FIG. 1E.

In many embodiments, the management frame 1500 may comprise a frame check sequence (FCS) field 1526. The FCS field 1526 may be four octets and may include extra checksum characters added to the frame 1500 for error detection and correction.

FIG. 1D illustrates an embodiment of a TIM information element (IE) 1600. An access point (AP) may transmit the TIM IE 1600 to inform stations such as low power sensors that the AP is buffering data for the station. In many embodiments, the station may then initiate communications with the AP to obtain the buffered data such as via a poll frame. In other embodiments, the AP may transmit the data to the station after transmitting the beacon.

The TIM information element 1600 may comprise fields such as an element identifier (ID) field 1602, a length field 1606, a delivery TIM (DTIM) count field 1608, a DTIM period field 1610, a TIM parameter field 1611, a TIM bitmap control field 1612, and TIM bitmap 1614. The element ID field 1602 may be one octet and may identify the element as a TIM information element 1600. The length field 1606 may be one octet and may define the length of the TIM IE 1600 or the length of a portion thereof. The DTIM count 1608 may be one octet and may indicate how many beacon frames (including the current frame) appear before the next DTIM frame. A DTIM Count field 1608 value of 0 may indicate that the current TIM IE frame is a DTIM frame. For instance, immediately after every DTIM (beacon frame with DTIM Count field 1608 of the TIM IE 1600 equal to zero), the AP may transmit all buffered, group-addressed frames. If the TIM IE indicating the buffered MSDU or aggregate MSDU (A-MSDU) is sent during a contention-free period (CFP), a contention-free (CF)-Pollable station operating in the power-savings (PS) mode does not send a power-saving (PS)-Poll frame, but remains active until the buffered MSDU or A-MSDU is received (or the CFP ends). If any station in its base service set (BSS) is in PS mode, the AP may buffer all group-addressed MSDUs and deliver them to all stations immediately following the next beacon frame containing a DTIM transmission.

The DTIM period field 1610 may be one octet and may indicate the number of beacon intervals between successive DTIMs. In many embodiments, if all TIM information element frames are DTIMs, the DTIM period field 1610 may have the value 1.

The TIM parameter field 1611 may comprise the values of Np and Nb. For instance, an embodiment of the TIM parameter field 1600 may comprise a number of pages (Np) field and a number of blocks per page (Nb) field.

The TIM bitmap control field 1612 may be one or two octets and may describe the content of the TIM bitmap 1614. For instance, the TIM bitmap control field 1612 may include a bit such as bit 0 that contains a traffic indicator bit associated with Group Address Buffered Data 0. This bit may be set to 1 in TIM IE 1600 with a value of 0 in the DTIM Count field 1608 when one or more group-addressed frames are buffered at the AP. And the TIM bitmap 1614 may comprise a bitmap such as the hierarchy 1100 illustrated in FIG. 1A or a portion thereof.

FIG. 1E depicts an embodiment of a management frame 1700 such as a beacon frame for communications between wireless communication devices such as communications devices 1010, 1030, 1050, and 1055 in FIG. 1. The management frame 1700 may comprise a MAC header 1701, a frame body 1714, and a cyclic redundancy check (CRC) field 1726. The MAC header 1701 may comprise the frame control field 1702 and other MAC header fields 1708. The frame control field 1702 may be two octets and may identify the type and subtype of the frame such as a management type and, e.g., a short beacon frame subtype. The other MAC header fields 1708 may comprise, for example, one or more address fields, identification fields, control fields, or the like.

In some embodiments, the management frame 1700 may comprise a frame body 1714. The frame body 1714 may be a variable number of octets and may include data elements, control elements, or parameters and capabilities. In the present embodiment, the frame body 1714 comprises a restricted access window (RAW) parameter set (PS) information element (IE) 1720.

FIG. 1F illustrates an embodiment of a RAW PS IE 1800. The RAW PS IE 1800 may comprise fields such as an element identifier (ID) field 1802, a length field 1806, a page index (ID) field 1808, a RAW start field 1810, a RAW end field 1812, a RAW start time field 1814, a RAW duration field 1815, a paged STA only field 1816, a group/resource allocation field 1818, and a slot definition field 1820. The element ID field 1802 may identify the element as a RAW PS IE 1800. The length field 1806 may define the length of the RAW PS IE 1800 or the length of a portion thereof. The page ID field 1808 may indicate the page index for hierarchical AID (based on hierarchical AID) of the allocated group. The RAW start field 1810 may indicate the AID of the first station in the range of stations associated with the RAW. In many embodiments, the RAW start AID 1810 may comprise the least significant bits (LSBs) of the first station. The LSBs may be a number of bits sufficient to distinguish the first station's AID from other station's AIDs. In the present embodiment, the first station may be any station in the page associated with the page ID field 1808 and the RAW start AID 1810 may comprise 11 LSBs of the AID for the first station.

The RAW end AID field 1812 may indicate the AID of the last station in the range of stations associated with the RAW. In many embodiments, the RAW end AID 1812 may comprise the least significant bits (LSBs) of the last station. The LSBs may be a number of bits sufficient to distinguish the last station's AID from other station's AIDs in the context of the RAW PS IE 1800 and the frame within which the RAW PS IE 1800 resides. In the present embodiment, the last station may be any station in the page associated with the page ID field 1808 and the RAW end AID 1812 may comprise 11 LSBs of the AID for the last station.

The RAW start time field 1814 may indicate the duration in time units (TU) from end of beacon transmission to RAW Start time. The RAW duration field 1815 may indicate the duration of RAW in time units (TU). The paged STA only field 1816 may comprise two bits and may set Bit 1 to 1 if only STAs with their TIM bit set to 1 are allowed to perform uplink (UL) transmissions. Bit 2 may be set to 1 if RAW is reserved for frames with duration smaller than slot duration, such as PS Polls/trigger frames. In some embodiments. Bit 2 may be ignored if Bit 1 is not set.

The Group/Resource allocation field 1818 may be set to 1 to indicate if STAs need to wake up at the beginning of the RAW to receive group addressed frames such as resource allocation. And the slot definition field 1820 may include, e.g., a slot duration and, in some embodiments, an indication regarding whether transmissions within the RAW may cross a slot boundary. For instance, the AP may indicate whether or not a transmission opportunity (TXOP) or transmission within a TXOP shall not extend across a slot boundary. If this TXOP rule is applied, the STA does not wait for ProbeDelay when waking up at the slot boundary.

Figure 2:
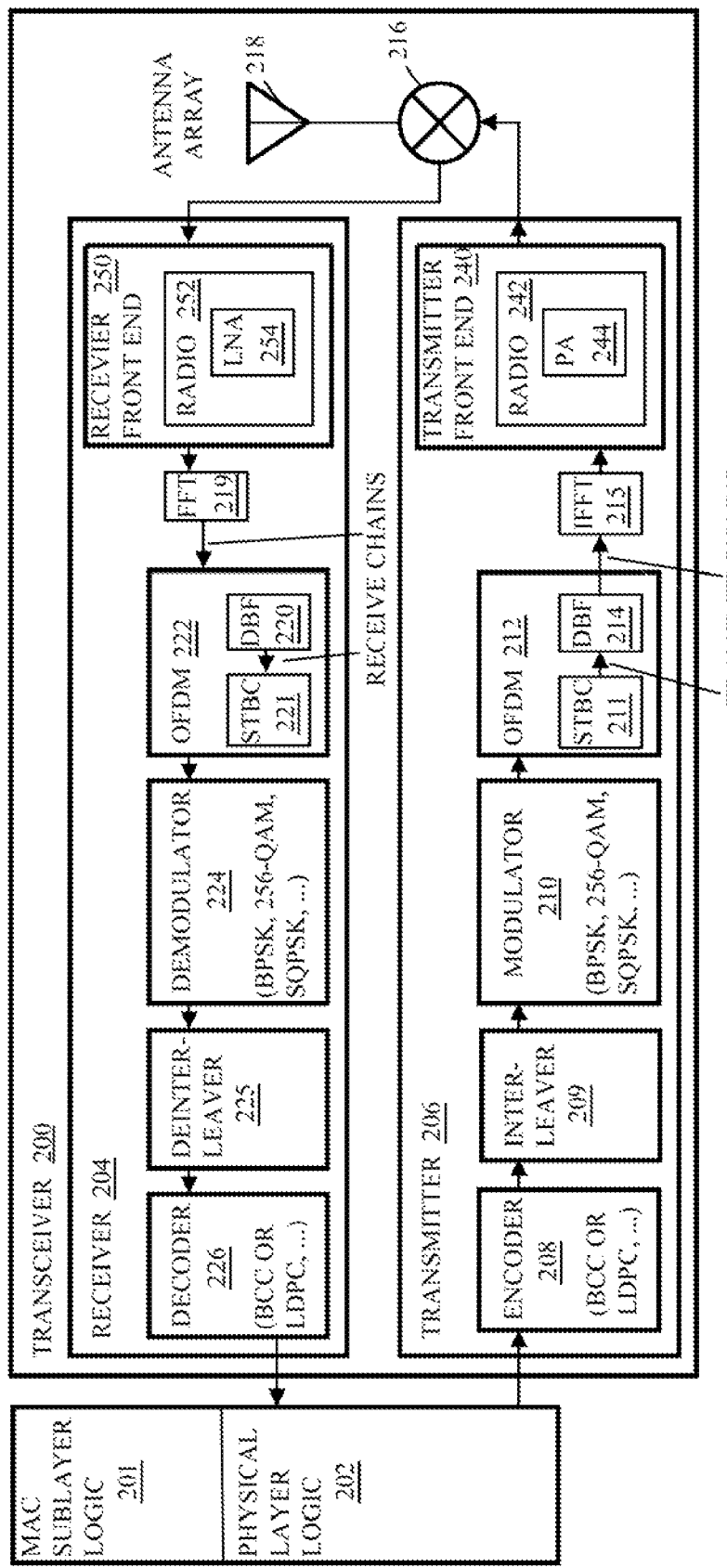
FIG. 2 depicts an embodiment of an apparatus to generate, transmit, receive, decode, and interpret a frame with a RAW AID range to associate stations with the RAW based upon a hierarchical data structure for traffic indication mapping.

FIG. 2 depicts an embodiment of an apparatus to generate, transmit, receive, and interpret or decode frames. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by prepending the frame or multiple frames, MAC protocol data units (MPDUs), with a preamble to transmit via transceiver 200. For example, a frame builder may generate a frame including a type field that specifies whether the frame is a management, control, or data frame and a subtype field to specify the function of the frame. A control frame may include a Ready-To-Send or Clear-To-Send frame. A management frame may comprise a Beacon, Probe Request/Response, Association Request/Response, and Reassociation Request/Response frame type. And the data type frame is designed to transmit data.

In many embodiments, the MAC sublayer logic 201 may comprise a frame builder 202 to generate frames such a management frame like a beacon frame with a range of station AIDs in the frame body. In many embodiments, the range of station AIDs is independent of the block associations and sub-block associations with the AIDs. In several embodiments, the range is identified by an AID of the first station in the range and an AID of the last station in the range. In some embodiments, a page ID, LSBs of a RAW start AID, and LSBs of a RAW end AID may identify the range. For example, an AP may transmit a beacon with a parameter set for a RAW that includes the range of AIDs for stations that are allowed to access the wireless medium during the RAW. The stations may receive the beacon and decode, parse, and interpret the beacon frame to determine the range of AIDs assigned to the RAW.

The PHY logic 250 may comprise a data unit builder 203. The data unit builder 203 may determine a preamble to prepend a MPDU or more than one MPDUs that include range of AIDs for stations that are allowed to access the wireless medium during the RAW to generate a PPDU. The data unit builder 203 may determine a preamble to prepend the MPDU or more than one MPDUs to generate a PPDU. In many embodiments, the data unit builder 203 may create the preamble based upon communications parameters chosen through interaction with a destination communications device. The preamble may comprise training sequences such a short training field (STF) and a long training field (LTF) to provide initial channel updates to the receiving device to allow the receiving device to update weight coefficients for a weighting function implemented by an equalizer in the receiving device.

The transceiver 200 comprises a receiver 204 and a transmitter 206. The transmitter 206 may comprise one or more of an encoder 208, an interleaver 209, a modulator 210, an OFDM 212, an IFFT 214, and a transmitter front end 240. The encoder 208 of transmitter 206 receives and encodes data destined for transmission from the MAC sublayer logic 202 with, e.g., a binary convolutional coding (BCC), a low density parity check coding (LDPC), and/or the like. The interleaver 209 may receive data from encoder 208 and may interleave the data to prevent long sequences of adjacent noisy bits from entering a BCC decoder of a receiver. The modulator 210 may receive data from interleaver 209, if the interleaver is implemented, and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid.

The output of modulator 209 is fed to an orthogonal frequency division multiplexing (OFDM) module 212. The OFDM module 212 may comprise a space-time block coding (STBC) module 211, and a digital beamforming (DBF) module 214. The STBC module 211 may receive constellation points from the modulator 209 corresponding to one or more spatial streams and may spread the spatial streams to a greater number of space-time streams (also generally referred to as data streams). Further embodiments may omit the STBC.

The OFDM module 212 impresses or maps the modulated data formed as OFDM symbols onto a plurality of orthogonal subcarriers so the OFDM symbols are encoded with the subcarriers or tones. In some embodiments, the OFDM symbols are fed to the Digital Beam Forming (DBF) module 214. Generally, digital beam forming uses digital signal processing algorithms that operate on the signals received by, and transmitted from, an array of antenna elements.

The Inverse Fast Fourier Transform (IFFT) module 215 may perform an inverse discrete Fourier transform (IDFT) on the OFDM symbols. The output of the IFFT module 215 may enter the guard interval (GI) module. The GI module may insert guard intervals by prepending to the symbol a circular extension of itself. In some embodiments, the GI module may also comprise windowing to optionally smooth the edges of each symbol to increase spectral decay.

The output of the GI module may enter the transmitter front end 240. The transmitter front end 240 may comprise a radio 242 with a power amplifier (PA) 244 to amplify the signal and prepare the signal for transmission via the antenna array 218.

The signal may be up-converted to a higher carrying frequency or may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal. In other embodiments, the transceiver 200 may comprise one or more antennas rather than antenna arrays and, in several embodiments, the receiver 204 and the transmitter 206 may comprise their own antennas or antenna arrays.

The transceiver 200 may comprise a receiver 204 for receiving, demodulating, and decoding information bearing communication signals. The receiver 204 may comprise a receiver front-end to detect the signal, detect the start of the packet, remove the carrier frequency, and amplify the sub-carriers via a radio 252 with a low noise amplifier (LNA) 254. The communication signals may comprise, e.g., 32 tones on a 1 MHz carrier frequency. The receiver 204 may comprise a fast Fourier transform (FFT) module 219. The FFT module 219 may transform the communication signals from the time domain to the frequency domain.

The receiver 204 may also comprise an OFDM module 222, a demodulator 224, a deinterleaver 225, and a decoder 226, and the equalizer 258 may output the weighted data signals for the OFDM packet to the OFDM module 222. The OFDM 222 extracts signal information as OFDM symbols from the plurality of subcarriers onto which information-bearing communication signals are modulated.

The OFDM module 222 may comprise a DBF module 220, and an STBC module 221. The received signals are fed from the equalizer to the DBF module 220. The DBF module 220 may comprise algorithms to process the received signals as a directional transmission directed toward to the receiver 204. And the STBC module 221 may transform the data streams from the space-time streams to spatial streams.

The demodulator 224 demodulates the spatial streams. Demodulation is the process of extracting data from the spatial streams to produce demodulated spatial streams. The method of demodulation depends on the method by which the information is modulated onto the received carrier signal and such information is included in the transmission vector (TXVECTOR) included in the communication signal. Thus, for example, if the modulation is BPSK, demodulation involves phase detection to convert phase information to a binary sequence. Demodulation provides to the deinterleaver 225 a sequence of bits of information.

The deinterleaver 225 may deinterleave the sequence of bits of information. For instance, the deinterleaver 225 may store the sequence of bits in columns in memory and remove or output the bits from the memory in rows to deinterleave the bits of information. The decoder 226 decodes the deinterleaved data from the demodulator 224 and transmits the decoded information, the MPDU, to the MAC sublayer logic 202.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may decode or parse the MPDU or MPDUs to determine the particular type of frame or frames and identify one or more information elements included in the MPDU(s). For instance, the information elements may comprise a TIM information element and/or a RAW PS information element. The MAC sublayer logic 201 may decode or parse the information elements to determine, e.g., whether or not an AP has data buffered for the MAC sublayer logic 201 and whether or not the MAC sublayer logic 201 is associated with the range of AIDs of stations assigned to the RAW defined in the RAW PS information element.

Figures 3A, 3B:
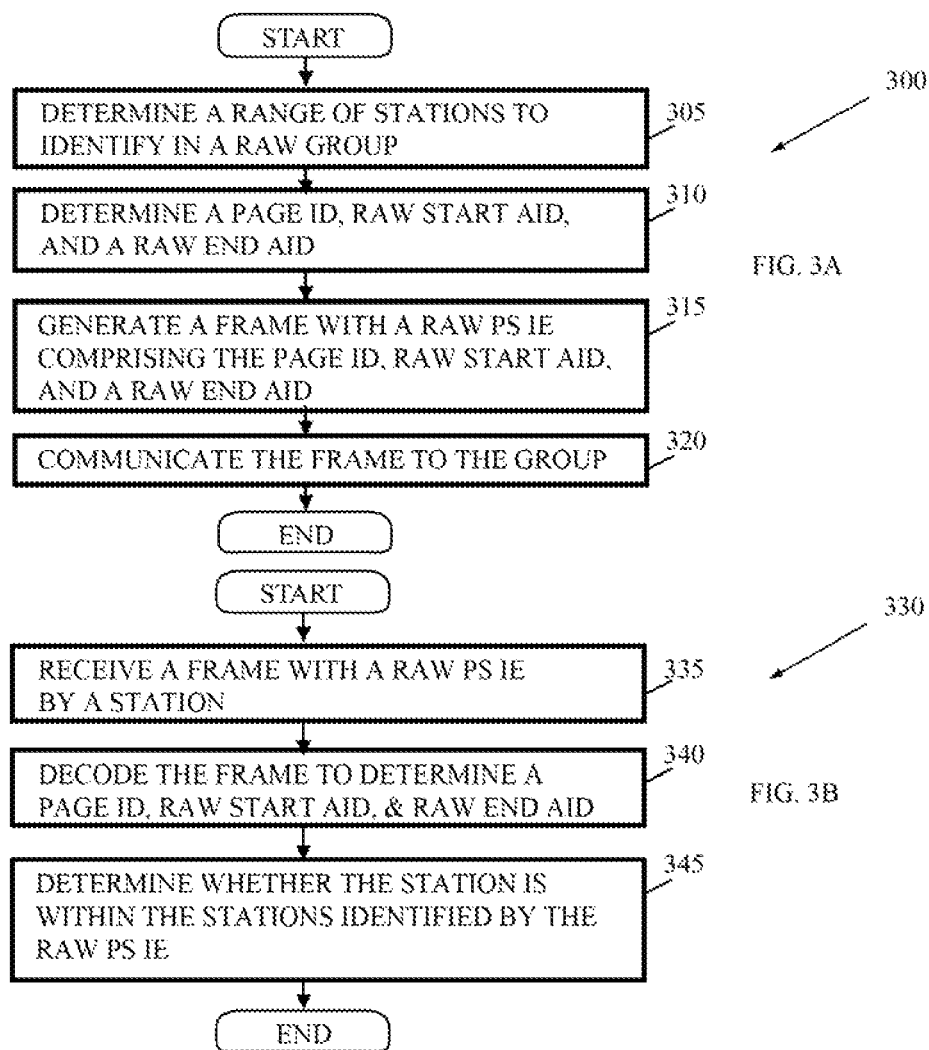
FIGS. 3A-B depict embodiments of flowcharts to generate a frame with RAW assignments based upon a hierarchical data structure for traffic indication mapping.

FIG. 3A depicts an embodiment of a flowchart 300 for an access point such as the communications device 1010 described in conjunction with FIG. 1, to determine a range of stations to assign to a restricted access window (RAW) and to communicate the assignments to the stations. The access point may determine the AID of the first station in the range of stations to assign to the RAW and identify the last station in the range of stations to assign to the RAW without regard to the position of the first and/or last stations in blocks identified in the TIM bitmap to determine a range of stations to identify in a RAW group (element 305). In other words, the first station in the range does not have to be the first station in a block of a page and the last station does not have to be the last station in a block of stations in the page. For example, the first station in the range assigned to the RAW group may be any station in a first block of the page and the last station of the range may be any other station within the first block having an AID greater than the AID of the first station or may be any of the stations, regardless of position, in a second block of the page.

After determining the AIDs of the first station and the last station, the access point may determine the page identifier associated with the AIDs as well as the least significant bits of the AIDs of the first station and the last station in the range. In several embodiments, the page ID may be the 2 most significant bits of the AIDs of the first and last stations in the range. In some embodiments, the RAW start AID may be the 11 least significant bits of the AID of the first station and the RAW end AID may be the 11 least significant bits of the AID of the last station in the range (element 310).

Based upon the page ID, RAW start AID, and RAW end AID, the access point may generate a frame that comprises a RAW parameter set (PS) information element (IE) (element 315) such as a beacon to transmit to stations associated with the access point. In some embodiments, the RAW PS IE may also comprise a RAW start time and a RAW duration to describe the RAW for the stations assigned to the RAW.

The access point may transmit the beacon with the RAW PS IE at a target beacon transmission time (TBTT) to stations with which the access point is associated to transmit the RAW assignments to the RAW group (element 320). In some embodiments, the beacon may also comprise a traffic indication map bitmap in a traffic indication map bitmap information element to identify the stations for which the access point is buffering data.

FIG. 3B depicts an embodiment of a flowchart 330 to determine whether a station, such as the communications device 1030 described in conjunction with FIG. 1, is within a range of stations assigned to a restricted access window (RAW). The station may wake at a target beacon transmission time (TBTT) to receive a beacon from an access point with which the station is associated (element 335). In some embodiments, the beacon may comprise a traffic indication map bitmap in a traffic indication map bitmap information element as well as a RAW parameter set (PS) information element (IE). The RAW parameter set (PS) information element (IE) may comprise a RAW start AID, a RAW end AID, a RAW start time, and a RAW duration in a RAW PS IE. In some embodiments, the most significant bits of the RAW start AID and the RAW end AID may be included in the RAW PS IE as a page identifier. In such embodiments, the RAW start AID and the RAW end AID may be included in the RAW PS IE as the least significant bits of each of the corresponding stations. In further embodiments, the station in a prior communication with the AP may have received some of this information.

In many embodiments, the station may decode the RAW PS IE to determine the page ID to determine if the station's AID is on the page and, if the station's AID is on the page associated with the RAW PS IE, the station may decode the RAW start AID and the RAW end AID (element 340). On the other hand, if the station is not on the page associated with the page ID of the RAW PS IE, then the station may determine that the station is not associated with the RAW and may terminate the decoding of the beacon.

If the station is on the page indicated by the page ID, then the station may compare the station's AID with the RAW start AID and the RAW end AID to determine if the station's AID is within the range of AIDs associated with the RAW (element 345). If the station's AID is not within the range associated with the RAW, then the station may determine that the station is not associated with the RAW and may terminate the decoding of the beacon. On the other hand, if the station's AID is within the range associated with the RAW, the station may decode a RAW start time and a RAW duration to determine the structure of the RAW. In several embodiments, the station may also determine the slot assignment for the station based upon a function stored in the memory of the station such as a function that divides the RAW duration by the number of stations assigned to the RAW and/or a function that multiplies an offset of the station's AID within the range by a slot duration.

In other embodiments, the station may compare the station's AID with a combination of the page ID and the RAW start AID. If the station's AID is greater than or equal to the combination of the page ID and the RAW start AID, the station may compare the station's AID with a combination of the page ID and the RAW end AID to determine if the station's AID is less than or equal to the combination of the page ID and the RAW end AID. If the station's AID is less than or equal to the combination of the page ID and the RAW end AID then the station's AID may be assigned to the RAW. On the other hand, if the station's AID is less than the combination of the page ID and the RAW start AID or greater than the combination of the page ID and the RAW end AID, the station may determine that the station is not assigned to the RAW. In some embodiments, the station may terminate the decoding of the beacon. In other embodiments, the station may continue to decode the beacon to determine other information from the beacon.

FIGS. 4A-B depict embodiments of flowcharts 400 and 450 to transmit, receive, and interpret or decode communications with a management frame such as beacon frames illustrated in FIGS. 1C-F. Referring to FIG. 4A, the flowchart 400 may begin with receiving a frame from the MAC sublayer logic of a communications device such as a beacon that includes a range of stations that are assigned to a restricted access window, wherein the range of stations may include one or more partial blocks of AIDs of stations that are assigned to the restricted access window. In some embodiments, the beacon may comprise a TIM information element.

The MAC sublayer logic of the communications device may generate the frame as a management frame to transmit to stations associated with the communications device and may pass the frame as an MPDU to a PHY logic that transforms the MPDU into a packet that can be transmitted to a station. The PHY logic may generate a preamble to prepend one or more of the MPDUs from the MAC sublayer logic to form a PPDU for transmission (element 405). The PPDU may then be transmitted via a physical layer device such as the transmitter 206 in FIG. 2 or the transceiver 1020, 1040 in FIG. 1 so the PPDU may be converted to a communication signal (element 410). The transmitter may then transmit the communication signal via the antenna (element 415).

Referring to FIG. 4B, the flowchart 450 begins with a receiver of a station such as the receiver 204 in FIG. 2 receiving a communication signal via one or more antenna(s) such as an antenna element of antenna array 218 (element 455). The receiver may convert the communication signal into one or more MPDUs in accordance with the process described in the preamble (element 460). More specifically, the received signal is fed from the one or more antennas to a DBF such as the DBF 220. The DBF processes the received signal as a directional transmission directed toward to the receiver. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 460) and transmits the one or more MPDUs to MAC sublayer logic such as MAC sublayer logic 202 (element 465).

The MAC sublayer logic may decode a management frame with a RAW PS IE in the MPDUs (element 470). For instance, the MAC sublayer logic may parse the RAW PS IE to determine the page ID field, the RAW start AID field, and possibly the RAW end AID field to determine whether the station's AID falls within the page and range of the AID's indicated in the RAW PS IE.

The following examples pertain to further embodiments. One example comprises an apparatus to transmit restricted access window (RAW) assignments. The apparatus may comprise a medium access control logic to generate a frame to define a range of RAW assignments, wherein the frame includes a page identifier, an identification of a first station in the range of RAW assignments, and an identification of a last station in the range of RAW assignments, wherein selection of the first station in the range of RAW assignments and the last station association in the range of RAW assignments is independent of locations of the first station and last station within blocks of the page associated with the page identifier; and a physical layer logic to prepend the frame with a preamble and to transmit the frame.

In some embodiments, the apparatus may further comprise an antenna to transmit the frame prepended by the preamble. In some embodiments, the medium access control logic comprises logic to generate the frame with a RAW Parameter Set (PS) information element (IE), the RAW PS IE comprising a RAW start AID field and a RAW end AID field. In some embodiments, the medium access control logic comprises logic to generate the frame with a RAW start AID field comprising least significant bits of an AID for the first station in the range of RAW assignments. In some embodiments, the medium access control logic comprises logic to generate the frame with a RAW end AID field to include least significant bits of an AID for the last station in the range of RAW assignments.

Another embodiment comprises one or more tangible computer-readable non-transitory storage media comprising computer-executable instructions operable to, when executed by at least one computer processor, enable the at least one computer processor to implement a method. The method may comprise generating a frame to define a range of RAW assignments, wherein the frame includes a page identifier, an identification of a first station in the range of RAW assignments, and an identification of a last station in the range of RAW assignments, wherein selection of the first station in the range of RAW assignments and the last station association in the range of RAW assignments is independent of locations of the first station and last station within blocks of the page associated with the page identifier.

In some embodiments, generating a frame comprises generating the frame with a RAW Parameter Set (PS) information element (IE), the RAW PS IE comprising a RAW start AID field and a RAW end AID field. In some embodiments, generating the frame with a RAW Parameter Set (PS) information element (IE) comprises generating the frame with a RAW start AID field comprising least significant bits of an AID for the first station in the range of RAW assignments. In some embodiments, generating the frame with a RAW Parameter Set (PS) information element (IE) comprises generating the frame with a RAW end AID field comprising least significant bits of an AID for the last station in the range of RAW assignments.

Another embodiment comprises a method to transmit restricted access window (RAW) assignments. The method may comprise generating, by a first communications device, a frame to define a range of RAW assignments, wherein the frame includes a page identifier, an identification of a first station in the range of RAW assignments, and an identification of a last station in the range of RAW assignments, wherein selection of the first station in the range of RAW assignments and the last station association in the range of RAW assignments is independent of locations of the first station and last station within blocks of the page associated with the page identifier; and transmitting, by the first communications device, the frame.

In some embodiments, generating, by the first communications device, a frame comprises generating the frame with a RAW Parameter Set (PS) information element (IE), the RAW PS IE comprising a RAW start AID field and a RAW end AID field. In some embodiments, generating the frame with a RAW Parameter Set (PS) information element (IE) comprises generating the frame with a RAW start AID field comprising least significant bits of an AID for the first station in the range of RAW assignments. In some embodiments, generating the frame with a RAW Parameter Set (PS) information element (IE) comprises generating the frame with a RAW end AID field comprising least significant bits of an AID for the last station in the range of RAW assignments.

Another embodiment comprises a system to transmit restricted access window (RAW) assignments. The system may comprise a processor, a memory coupled with the processor; a means for generating a frame to define a range of RAW assignments, wherein the frame includes a page identifier, an identification of a first station in the range of RAW assignments, and an identification of a last station in the range of RAW assignments, wherein selection of the first station in the range of RAW assignments and the last station association in the range of RAW assignments is independent of locations of the first station and last station within blocks of the page associated with the page identifier; a radio coupled with the means for generating the frame; and one or more antennas coupled with the radio to transmit the frame.

In some embodiments, the frame includes a RAW Parameter Set (PS) information element (IE), the RAW PS IE including a RAW start association identifier (AID) field and a RAW end AID field. In some embodiments, the RAW start AID field includes least significant bits of an AID for the first station in the range of RAW assignments. In some embodiments, the RAW end AID field to includes least significant bits of an AID for the last station in the range of RAW assignments.

Another embodiment comprises an apparatus to determine restricted access window (RAW) assignments. The apparatus may comprise a memory; logic coupled with the memory to receive a frame comprising RAW assignments; determine a page identifier value, a RAW start association identifier (AID) value, and a RAW end AID value; and determine if the RAW assignments comprise an AID associated with the apparatus based upon the values.

In some embodiments, the logic is configured to compare most significant bits of the AID associated with the apparatus against the page identifier value to determine if the RAW assignments are for a page associated with the AID of the apparatus. In some embodiments, the logic is configured to compare least significant bits of the AID associated with the apparatus against the RAW start AID value to determine if the AID of the apparatus is within the RAW assignments. In some embodiments, the logic is configured to compare least significant bits of the AID associated with the apparatus against the RAW end AID value to determine if the AID of the apparatus is within the RAW assignments.

One or more tangible computer-readable non-transitory storage media comprising computer-executable instructions operable to, when executed by at least one computer processor, enable the at least one computer processor to implement a method. The method may comprise receiving, by a station, a frame comprising RAW assignments; determining, by the station, a page identifier value, a RAW start association identifier (AID) value, and a RAW end AID value from the frame; and determining if the RAW assignments comprise an AID associated with the station based upon the values.

In some embodiments, determining if the RAW assignments comprise an AID associated with the station based upon the values comprises determining if the AID of the station is associated with the page ID value. In some embodiments, determining if the RAW assignments comprise an AID associated with the station based upon the values comprises determining if least significant bits of the AID of the station is greater than or equal to the RAW start AID value. In some embodiments, determining if the RAW assignments comprise an AID associated with the station based upon the values comprises determining if least significant bits of the AID of the station is less than or equal to the RAW end AID value.

Another embodiment comprises a system to determine restricted access window (RAW) assignments. The system may comprise a radio and one or more antennas; and logic coupled with the radio and one or more antennas to receive a frame comprising RAW assignments; determine a page identifier value, a RAW start association identifier (AID) value, and a RAW end AID value; and determine if the RAW assignments comprise an AID associated with the system based upon the values.

In some embodiments, the system may further comprise dynamic random access memory to store the values. In some embodiments, the logic is configured to determine a start AID in the RAW assignments based upon a combination of the page identifier value and the RAW start AID value and to determine a last AID in the RAW assignments based upon a combination of the page identifier value and the RAW end AID value. In some embodiments, the page identifier value is a first two most significant bits of the start AID and the last AID, the RAW start AID value comprises eleven least significant bits of the start AID, and the RAW end AID value comprises eleven least significant bits of the last AID in the range of RAW assignments.

Another embodiment comprises a method to determine restricted access window (RAW) assignments. The method may comprise receiving, by a station, a frame comprising RAW assignments; determining, by the station, a page identifier value, a RAW start association identifier (AID) value, and a RAW end AID value from the frame; and determining if the RAW assignments comprise an AID associated with the station based upon the values.

In some embodiments, determining if the RAW assignments comprise an AID associated with the station based upon the values comprises determining if the AID of the station is associated with the page ID value. In some embodiments, determining if the RAW assignments comprise an AID associated with the station based upon the values comprises determining if least significant bits of the AID of the station is greater than or equal to the RAW start AID value. In some embodiments, determining if the RAW assignments comprise an AID associated with the station based upon the values comprises determining if least significant bits of the AID of the station is less than or equal to the RAW end AID value.

Another embodiment comprises an apparatus to transmit restricted access window (RAW) assignments. The apparatus may comprise a means for generating a frame to define a range of RAW assignments, wherein the frame includes a page identifier, an identification of a first station in the range of RAW assignments, and an identification of a last station in the range of RAW assignments, wherein selection of the first station in the range of RAW assignments and the last station association in the range of RAW assignments is independent of locations of the first station and last station within blocks of the page associated with the page identifier; and a means for transmitting the frame.

In some embodiments, the frame includes a RAW Parameter Set (PS) information element (IE), the RAW PS IE including a RAW start association identifier (AID) field and a RAW end AID field. In some embodiments, the RAW start AID field includes least significant bits of an AID for the first station in the range of RAW assignments. In some embodiments, the RAW end AID field to includes least significant bits of an AID for the last station in the range of RAW assignments.

Another embodiment comprises an apparatus to determine restricted access window (RAW) assignments. The apparatus may comprise a means for receiving a frame comprising RAW assignments; a means for determining a page identifier value, a RAW start association identifier (AID) value, and a RAW end AID value from the frame; and a means for determining if the RAW assignments comprise an AID associated with a station based upon the values.

In some embodiments, the means for determining if the RAW assignments comprise an AID associated with the station based upon the values comprises a means for determining if the AID of the station is associated with the page ID value. In some embodiments, the means for determining if the RAW assignments comprise an AID associated with the station based upon the values comprises a means for determining if least significant bits of the AID of the station is greater than or equal to the RAW start AID value. In some embodiments, the means for determining if the RAW assignments comprise an AID associated with the station based upon the values comprises a means for determining if least significant bits of the AID of the station is less than or equal to the RAW end AID value.

Another embodiment comprises a system to transmit restricted access window (RAW) assignments. The apparatus may comprise a processor; a memory coupled with the processor, a means for generating a frame to define a range of RAW assignments, wherein the frame includes a page identifier, an identification of a first station in the range of RAW assignments, and an identification of a last station in the range of RAW assignments, wherein selection of the first station in the range of RAW assignments and the last station association in the range of RAW assignments is independent of locations of the first station and last station within blocks of the page associated with the page identifier, a radio coupled with the means for generating the frame; and one or more antennas coupled with the radio to transmit the frame.

In some embodiments, the frame includes a RAW Parameter Set (PS) information element (IE), the RAW PS IE including a RAW start association identifier (AID) field and a RAW end AID field. In some embodiments, the RAW start AID field includes least significant bits of an AID for the first station in the range of RAW assignments. In some embodiments, the RAW end AID field to includes least significant bits of an AID for the last station in the range of RAW assignments.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. An apparatus comprising:
  circuitry to access restricted access window (RAW) group fields of a RAW parameter set element (RPS element), the fields comprising:
    a Page index, a RAW Start Association Identifier (AID), and a RAW End AID, wherein:
    the Page index, the RAW start AID, and the RAW end AID to collectively identify a group of one or more stations permitted to access a medium during a RAW,
    the Page index is to identify a page index for the group of one or more stations,
    the RAW start AID comprises a portion of an AID of a first station in the group of one or more stations and the first station to have a corresponding RAW, the RAW Start Aid comprising 11 least significant bits (LSB) of the AID of the first station, and
    the RAW end AID comprises a portion of an AID of a second station in the group of one or more stations and the second station to have a corresponding RAW, the RAW End AID comprising 11 LSB of the AID of the second station; and
  circuitry to access the medium based at least in part on the Page index, the RAW start AID, and the RAW end AID.

2. The apparatus of claim 1, wherein:
  the Page index comprises 2 bits, the 2 bits comprising two most significant bits (MSB) of the AID of the first and second stations.

3. The apparatus of claim 1, further comprising:
  circuitry to store at least one traffic indication mapping (TIM) bitmap, each bit of the bitmap to indicate whether a station has buffered data at an access point and wherein the TIM bitmap is part of a same frame as that of the RPS element.

4. The apparatus of claim 1, further comprising:
  circuitry to cause a wake up from reduced power mode at least during a target beacon transmission time to receive a beacon comprising the RPS element.

5. The apparatus of claim 1, further comprising:
  circuitry to determine whether an AID is within a range specified by a combination of the page index and the RAW start AID and the RAW end AID; and
  circuitry to selectively terminate decode of a frame that includes the RPS element if the AID is not within the range.

6. The apparatus of claim 1, further comprising:
  circuitry to determine if a station's AID is on a page corresponding to the Page index;
  circuitry to terminate decode of a beacon in response to the station's AID is not on a page corresponding to the Page index;
  circuitry to decode the RAW start AID and the RAW end AID in response to the station's AID is on a page corresponding to the Page index;
  circuitry to determine whether the station's AID is within a range of AIDs associated with a RAW based at least in part on the RAW start AID and the RAW end AID;
  circuitry to terminate decode of the beacon in response to the station's AID is not within the range of AIDs associated with the RAW; and
  circuitry to determine a slot to access a medium in response to the station's AID is within the range of AIDs associated with the RAW.

7. The apparatus of claim 1, further comprising:
  circuitry to determine whether a station's AID is within a range specified by a combination of the Page index and the RAW start AID and a combination of the Page index and the RAW end AID;
  circuitry to determine a slot assignment for the station; and
  circuitry to access the medium during the slot assignment.

8. The apparatus of claim 7, wherein the RPS element further comprises RAW start time and RAW duration fields and wherein the circuitry to determine a slot assignment for the station is to determine slot assignment by division of the RAW duration by a number of stations assigned to the RAW or multiplication of an offset of the station's AID by a slot duration.

9. The apparatus of claim 1, wherein the first station and the second station are a same station.

10. The apparatus of claim 1, wherein one or more of the circuitry is part of a MAC sublayer circuitry.

11. The apparatus of claim 1, further comprising:
  a physical layer circuitry;
  a radio communicatively coupled to the physical layer circuitry; and at least one antenna communicatively coupled to the radio.

12. The apparatus of claim 11, further comprising:
at least one processor communicatively coupled to the radio;
at least one memory communicatively coupled to the at least one processor; and
a display communicatively coupled to the at least one processor.

13. At least one non-transitory computer-readable medium, comprising instructions stored thereon, which, if executed by one or more processors, cause the one or more processors to cause a wireless communication device to:
access restricted access window (RAW) group fields of a RAW parameter set element (RPS element), the fields comprising:
a Page index, a RAW Start Association Identifier (AID), and a RAW End AID, wherein:
the Page index, the RAW start AID, and the RAW end AID to collectively identify a group of one or more stations permitted to access a medium during a RAW,
the Page index is to identify a page index for the group of one or more stations,
the RAW start AID comprises a portion of an AID of a first station in the group of one or more stations and the first station to have a corresponding RAW, the RAW Start AID comprising 11 least significant bits (LSB) of the AID of the first station, and
the RAW end AID comprises a portion of an AID of a second station in the group of one or more stations and the second station to have a corresponding RAW, the RAW End AID comprising 11 LSB of the AID of the second station; and
access the medium based at least in part on the Page index, the RAW start AID, and the RAW end AID.

14. The at least one non-transitory computer-readable medium of claim 13, wherein:
the Page index comprises 2 bits, the 2 bits comprising two most significant bits (MSB) of the AID of the first and second stations.

15. The at least one non-transitory computer-readable medium of claim 13, further comprising instructions stored thereon, which, if executed by one or more processors, cause the one or more processors to cause the wireless communication device to:
store at least one traffic indication mapping (TIM) bitmap, each bit of the bitmap to indicate whether a station has buffered data at an access point and wherein the TIM bitmap is part of a same frame as that of the RPS element.

16. The at least one non-transitory computer-readable medium of claim 13, further comprising instructions stored thereon, which, if executed by one or more processors, cause the one or more processors to cause the wireless communication device to:
cause a wake up from reduced power mode at least during a target beacon transmission time to receive a beacon comprising the RPS element.

17. The at least one non-transitory computer-readable medium of claim 13, further comprising instructions stored thereon, which, if executed by one or more processors, cause the one or more processors to cause the wireless communication device to:
determine whether an AID is within a range specified by a combination of the page index and the RAW start AID and the RAW end AID; and
selectively terminate decode of a frame that includes the RPS element if the AID is not within the range.

18. The at least one non-transitory computer-readable medium of claim 13, further comprising instructions stored thereon, which, if executed by one or more processors, cause the one or more processors to cause the wireless communication device to:
determine if a station's AID is on a page corresponding to the Page index;
terminate decode of a beacon in response to the station's AID is not on a page corresponding to the Page index;
decode the RAW start AID and the RAW end AID in response to the station's AID is on a page corresponding to the Page index;
determine whether the station's AID is within a range of AIDs associated with a RAW based at least in part on the RAW start AID and the RAW end AID;
terminate decode of the beacon in response to the station's AID is not within the range of AIDs associated with the RAW; and
determine a slot to access a medium in response to the station's AID is within the range of AIDs associated with the RAW.

19. The at least one non-transitory computer-readable medium of claim 13, further comprising instructions stored thereon, which, if executed by one or more processors, cause the one or more processors to cause the wireless communication device to:
determine whether a station's AID is within a range specified by a combination of the Page index and the RAW start AID and a combination of the Page index and the RAW end AID;
determine a slot assignment for the station; and
access of the medium during the slot assignment.

20. The at least one non-transitory computer-readable medium of claim 19, wherein the RPS element further comprises RAW start time and RAW duration fields and wherein the determine a slot assignment for the station is to determine slot assignment by division of the RAW duration by a number of stations assigned to the RAW or multiplication of an offset of the station's AID by a slot duration.

21. The at least one non-transitory computer-readable medium of claim 13, wherein the first station and the second station are a same station.

22. A computer-implemented method comprising:
accessing restricted access window (RAW) group fields of a RAW parameter set element (RPS element), the fields comprising:
a Page index, a RAW Start Association Identifier (AID), and a RAW End AID, wherein:
the Page index, the RAW start AID, and the RAW end AID to collectively identify a group of one or more stations permitted to access a medium during a RAW,
the Page index is to identify a page index for the group of one or more stations,
the RAW start AID comprises a portion of an AID of a first station in the group of one or more stations and the first station to have a corresponding RAW, the RAW Start AID comprising 11 least significant bits (LSB) of the AID of the first station, and
the RAW end AID comprises a portion of an AID of a second station in the group of one or more stations and the second station to have a corresponding RAW, the RAW End AID comprising 11 LSB of the AID of the second station; and
accessing the medium based at least in part on the Page index, the RAW start AID, and the RAW end AID.

23. The method of claim 22, wherein:
the Page index comprises 2 bits, the 2 bits comprising two most significant bits (MSB) of the AID of the first and second stations.

24. The method of claim 22, further comprising:
storing at least one traffic indication mapping (TIM) bitmap, each bit of the bitmap to indicate whether a station has buffered data at an access point and wherein the TIM bitmap is part of a same frame as that of the RPS element.

25. The method of claim 22, further comprising:
causing a wake up from reduced power mode at least during a target beacon transmission time to receive a beacon comprising the RPS element.

26. The method of claim 22, further comprising:
determining whether an AID is within a range specified by a combination of the page index and the RAW start AID and the RAW end AID; and
selectively terminating decode of a frame that includes the RPS element if the AID is not within the range.

27. The method of claim 22, further comprising:
determining if a station's AID is on a page corresponding to the Page index;
terminating decode of a beacon in response to the station's AID is not on a page corresponding to the Page index;
decoding the RAW start AID and the RAW end AID in response to the station's AID is on a page corresponding to the Page index;
determining whether the station's AID is within a range of AIDs associated with a RAW based at least in part on the RAW start AID and the RAW end AID;
terminating decode of the beacon in response to the station's AID is not within the range of AIDs associated with the RAW; and
determining a slot to access a medium in response to the station's AID is within the range of AIDs associated with the RAW.

28. The method of claim 22, further comprising:
determining whether a station's AID is within a range specified by a combination of the Page index and the RAW start AID and a combination of the Page index and the RAW end AID;
determining a slot assignment for the station; and
accessing of the medium during the slot assignment.

29. The method of claim 28, wherein the RPS element further comprises RAW start time and RAW duration fields and wherein the determining a slot assignment for the station comprises determining a slot assignment by division of the RAW duration by a number of stations assigned to the RAW or multiplication of an offset of the station's AID by a slot duration.

30. The method of claim 22, wherein the first station and the second station are a same station.

\* \* \* \* \*